Patented Dec. 10, 1940

2,224,777

UNITED STATES PATENT OFFICE 2,224,777

CHALK RESISTANT TITANIUM PIGMENT

James E. Booge, Wilmington, Del., assignor to E. I. du Pont de Nemours & Company, Wilmington, Del., a corporation of Delaware No Drawing. Application March 18, 1939, Serial No. 262,695

17 Claims. (Cl. 134—58)

This invention relates to the production of improved titanium pigments. More particularly it relates to the production of titanium dioxide pigments containing an antimony compound, said pigments possessing improved physical properties. Still more particularly it relates to the production of titanium dioxide pigments containing an antimony compound, said pigments when employed in film forming vehicles imparting thereto improved weathering characteristics.

It is well-known in the art that titanium pigments are prepared by hydrolytically precipitating hydrated titanium compounds from an acidic solution of titanium and iron salts, such as the sulfates, the solution having been obtained by treating titaniferous irons, such as ilmenite, with sulfuric acid. The precipitate of hydrated titanium compounds, consisting principally of titanium hydroxide with absorbed water and acid, is washed to remove soluble compounds, such as iron, chromium, etc., and after the addition of a conditioning agent, such as potassium sulfate, is calcined at a temperature suitable for removing absorbed water and acid and for developing pigmentary properties, said temperature usually being between about 700° C. and about 1000° C. The exact calcination temperature is dependent upon the nature of the product desired. In general, the pigment properties such as color and opacity, improve with increasing temperature after which they are degraded rapidly by further increases. On the other hand, the hardness of the pigment and correspondingly, its durability in dried paint films becomes increasingly great as the temperature of calcination is elevated. The increased hardness of the pigment is usually accompanied by a marked decrease in the normal oil requirement.

Titanium pigments, when prepared as herein described, and when exposed to the action of the weather in dry paint, enamel, and lacquer films usually exhibit a peculiar and relatively rapid type of failure known as "chalking." This failure manifests itself as a tendency of the surface of the paint film to disintegrate to a powdery chalk which when removed by the eroding action of wind, rain, etc., exposes other underlying portions of the paint film to similar failure.

When mixed with coloring agents to form tinted paint films, the white titanium compounds, prepared as described above, will tend to produce a whitish chalk on the surface of the tinted paint upon exposure to the atmosphere, thereby causing an unsightly and "faded" appearance. Further, when incorporated in a film with colored organic dyestuff, white titanium compounds frequently have a tendency to accelerate the fading of these colored materials, particularly when exposed to a source of light, such as sunlight.

It is known that if the temperature of calcination is sufficiently elevated, pigments can be produced which show a reduced tendency to cause chalking when exposed to the weather in dry paint films. However, when the temperature of calcination is raised sufficiently to increase materially the durability of these white titanium pigments, the desirable properties such as excellent white color, high opacity, softness, etc., are seriously degraded.

This invention has as an object the production of improved titanium pigments. A further object is the production of white titanium pigments which exhibit exceptional durability and fastness to light when incorporated in paint films and exposed to the elements. A further object is the production of a surface modified titanium oxide pigment comprising the anatase crystal form characterized by its excellent durability and inertness. A further object is the production of an antimony oxide containing titanium pigment which is characterized by its inertness and non-reactivity in the presence of glycerine containing compositions. A further object is the production of titanium pigments which are particularly adaptable for use in exterior paints and synthetic automotive finishes. Additional objects will become apparent from an examination of the following description and claims.

These objects are attained according to the herein described invention which broadly comprises calcining a mixture comprising a titanium pigment and an oxide of antimony or a compound of antimony which yields an oxide of antimony under calcination conditions.

In a more restricted embodiment this invention comprises preparing a titanium hydrolysate by the hydrolysis of a titanium salt solution according to processes well-known in the art, subsequently filtering and washing the titanium precipitate in order to substantially free it of acid and color imparting impurities which are normally found in mineral acid solutions of titanium ores. The product so obtained is mixed with between about 0.1% and about 55%, and preferably between about 0.5% and about 5%, Sb calculated on the $TiO_2$ present. The resultant mixture is thereafter calcined at a temperature between about 800° C. and about 1100° C.

The preferred embodiment of this invention comprises preparing a titanium dioxide hydrolysate by the hydrolysis of a titanium salt solution by processes well-known in the art, subsequently filtering and washing the titanium precipitate to substantially free it of acid and color imparting impurities which are normally found in mineral acid solutions of titanium ores. The product so obtained is calcined at a temperature between about 900° C. and about 1050° C. The resultant titanium oxide pigment is wet ground and wet-blended with between about 0.5% and about 5% Sb calculated on the TiO₂ present, thereby effecting uniform distribution of the antimony reagent. The antimony compound which I prefer to employ is antimony trioxide. This uniformity insures the obtainment of the maximum benefits which are to be had by this invention. The mixture is then calcined at a temperature substantially lower than that specified above where the titanium pigment is subjected to only one calcination. Temperatures as low as about 500° C. and preferably not higher than about 750° C. are employed in this modification. Said calcination at a temperature higher than 750° C. is unnecessary in this instance since the maximum hiding power of the titanium pigment has been previously developed and as a result, a soft unsintered product is produced. The product made in this manner is low in soluble salts and only required dry grinding or a disintegrating treatment before its subsequent use in coating compositions and other pigmented materials.

I have found that the reagent, antimony, may be added during a number of operations in the processing of titanium pigments. For instance, the antimony may be added to the titanium ore prior to the ore being dissolved in acid. Also, I may add the reagent to seeded (or nucleated) titanium sulfate liquor where it will be intimately mixed with the hydrated titanium oxide when hydrolysis is effected. Further, I may make the addition along with other conditioning agents and for this purpose either the oxides or salts, such as the trichloride, of antimony may be used. Still further, I have found that the antimony compound may be mixed with completely processed titanium pigments and the mixture when calcined produces a titanium pigment exhibiting a superior durability characteristic and fastness to light that are characteristic of the process described herein. Still further, as described in the preferred embodiment of my invention, I may add the antimony reagent to an already calcined titanium pigment.

Sulfuric acid is normally used in the industry as the solvent for titanium ores, especially ilmenite. The ores contain a small amount of phosphorus and as a result these solutions are phosphorus bearing. During hydrolysis the major portion of this impurity is adsorbed on the precipitated titanium oxide and occurs as adsorbed phosphoric oxide. Its presence in the pigment definitely modifies the properties and since it is not readily removed by simple processes the phosphorus content of the ore is to be largely found in the finished pigment. In addition to phosphoric acid, calcination of titanium oxide is often times carried out in the presence of alkali metal compounds. Potassium sulfate is the most widely used compound of this character and is particularly effective in maintaining color and tinting strength at the highest level. As herein described, these two chemicals which are present during the calcination exert their influence in the development of pigment properties and their presence is not to be avoided in most instances. In the practice of my invention no action to provide for their absence is necessary, although the benefits to be derived by calcination in the presence of the antimony can be obtained even in the absence of alkali metal compounds and/or sulfuric acid or phosphates. It is, of course, understood that the properties will be modified and slightly different when titanium oxides of different composition as regard these compounds are calcined but such modification is small compared to the benefits which are obtained through the use of the antimony reagents.

The following examples are given for illustrative purposes and are not intended to place any limitations or restrictions upon the herein described invention.

*Example I*

Hydrated titanium oxide obtained by hydrolytic precipitation from titanium sulfate solution was washed thoroughly to remove impurities. To the washed hydrated titanium oxide was added 0.5% of potassium sulfate and 1% of antimony trioxide calculated on the TiO₂ present and the mixture calcined at 1000° C. for one hour in a muffle furnace. The product produced was a white titanium pigment of excellent durability and fastness to light and having pigmentary properties analogous to those of hydrated titanium oxide treated with 0.5% potassium sulfate only and calcined, namely, an excellent neutral color of high brightness, high opacity, and a soft and pleasing texture. The product was very useful in plastics. The product of calcination contains substantially all of the original antimony added prior to heating, indicating a combination of this element with the titanium compound since otherwise at the temperature employed, a portion of the antimony trioxide would normally have been lost by volatilization.

*Example II*

Hydrated titanium oxide obtained by hydrolytic precipitation from titanium sulfate solution was washed thoroughly to remove impurities. To the washed hydrated titanium oxide was added 0.5% of potassium sulfate and 5% of antimony trioxide calculated on the TiO₂ present and the mixture calcined at 1000° C. for one hour in a muffle furnace. The product produced was a white titanium pigment of excellent durability and fastness to light and having pigmentary properties analogous to those of hydrated titanium oxide treated with 0.5% potassium sulfate only and calcined, namely, an excellent neutral color of high brightness, high opacity, and a soft and pleasing texture. The product of calcination contains substantially all of the original antimony added prior to heating, indicating a combination of this element with the titanium compound since otherwise at the temperature employed, a portion of the antimony trioxide would normally have been lost by volatilization.

*Example III*

Hydrated titanium oxide obtained by hydrolytic precipitation from titanium sulfate solution was washed thoroughly to remove impurities. To the washed hydrated titanium oxide was added 0.5% of potassium sulfate and 10% of antimony trioxide calculated on the TiO₂ present and the mixture calcined at 1000° C. for one hour in a muffle furnace. The product produced was a white titanium pigment of excellent durability and fastness to light and having pigmentary properties analogous to those of hydrated titanium oxide treated with 0.5% potassium sulfate only and calcined, namely, an excellent neutral color of high brightness, high opacity, and a soft and pleasing texture. The product of calcination contains substantially all of the original antimony added prior to heating, indicating a combination of this element with the titanium compound since otherwise at the temperature employed, a portion of the antimony trioxide would normally have been lost by volatilization.

Example IV

A titanium sulfate solution in sulfuric acid containing 0.3% of hydrated titanium oxide as "seed" had added to it 0.5 parts by weight of antimony oxide per 100 parts of $TiO_2$ in solution. The mixture was heated and diluted in order to cause the hydrolytic precipitation of hydrated titanium oxide, after which the mixture was washed thoroughly to remove soluble impurities, 1% potassium carbonate was added to the hydrated precipitate and was then calcined at 950° C. for three hours, thereby producing a white titanium pigment of high brightness, neutral tone, high opacity, great softness, good fastness to light, and which was capable of forming films of great durability.

Example V

A titanium sulfate solution in sulfuric acid containing 0.3% of hydrated titanium oxide as "seed" had added to it 2 parts by weight of antimony oxide per 100 parts of $TiO_2$ in solution. The mixture was heated and diluted in order to cause the hydrolytic precipitation of hydrated titanium oxide, after which the mixture was washed thoroughly to remove soluble impurities. 0.4% potassium carbonate was added to the hydrated precipitate and was then calcined at 950° C., thereby producing a white titanium pigment of high brightness, neutral tone, high opacity, great softness, good fastness to light, and which was capable of forming films of great durability.

Example VI

A titanium sulfate solution in sulfuric acid containing 1.0% of hydrated titanium oxide as "seed" had added to it 3 parts by weight of antimony oxide per 100 parts of $TiO_2$ in solution. The mixture was heated and diluted in order to cause the hydrolytic precipitation of hydrated titanium oxide, after which the mixture was washed thoroughly to remove soluble impurities. 0.35% potassium carbonate was added to the hydrated precipitate and was then calcined at 950° C., thereby producing a white titanium pigment of high brightness, neutral tone, high opacity, great softness, good fastness to light, and which was capable of forming films of great durability.

Example VII

A titanium sulfate solution in sulfuric acid containing 0.3% of hydrated titanium oxide as "seed" had added to it 5 parts by weight of antimony oxide per 100 parts of $TiO_2$ in solution. The mixture was heated and diluted in order to cause the hydrolytic precipitation of hydrated titanium oxide, after which the mixture was washed thoroughly to remove soluble impurities. 1% potassium carbonate was added to the hydrated precipitate and was then calcined at 950° C., thereby producing white titanium pigment of high brightness, neutral tone, high opacity, great softness, good fastness to light, and which was capable of forming films of great durability.

Example VIII

A titanium sulfate solution in sulfuric acid containing 0.5% of hydrated titanium oxide as "seed" had added to it 40 parts by weight of antimony oxide per 100 parts of $TiO_2$ in solution. The mixture was heated and diluted in order to cause the hydrolytic precipitation of hydrated titanium oxide, after which the mixture was washed thoroughly to remove soluble impurities. 1% of potassium carbonate was added to the hydated precipitate and was then calcined at 980° C. The pigment produced was of high quality.

Example IX

A calcined titanium oxide pigment had intimately mixed with it 1% of antimony oxide and the mixture was calcined at 500° C. to produce a white titanium pigment of excellent color, opacity, softness, good fastness to light, and which was useful for forming organic films of exceptional durability.

Example X

A calcined titanium oxide pigment had intimately mixed with it 5% antimony trioxide and the mixture was calcined at 500° C. to produce a white titanium pigment of excellent color, opacity, softness, good fastness to light, and which was useful for forming organic films of exceptional durability.

Example XI

A calcined titanium oxide pigment had intimately mixed with it 10% antimony trioxide and the mixture was calcined at 500° C. to produce a white titanium pigment of excellent color, opacity, softness, good fastness to light, and which was useful for forming organic films of exceptional durability.

It is to be understood that the herein described specific embodiments of this invention may be subjected to variation and modification without departing from the scope and spirit thereof.

For instance the examples given above specify calcination in a muffle furnace at a constant temperature. However, it is to be understood that other means of calcination may be employed. Thus, it is common in industrial practice to use a cylindrical type rotary kiln in which the flow of heat is counter to the flow of materials. When calcining in said rotary kiln, the final temperature may be as high as 1200° C. Inasmuch as the material in such a rotary furnace will be held at the maximum temperature for only a relatively short time, it is found that a maximum temperature of 1025° C. corresponds approximately to heating the pigment for one hour at 1000° C. in a muffle furnace.

It is to be understood that it is preferred to add the antimony compound to a previously calcined and finely ground titanium oxide in which the pigment properties such as color, tinting strength, etc., are fully developed and subsequently recalcining the mixture to effect combination of the titanium and antimony compounds and to modify the character of the pigment, thereby imparting greatly improved exterior durability which is gained without substantial sacrifice in other properties. However, as stated herein the addition of the antimony may be made to a precipitated and washed titanium hydrate prior to calcination. Further, as noted in the above examples, the oxide may be added to the solution of titanium sulfate prior to the hydrolytic precipitation of the hydrated titanium oxide, whence it will be in intimate contact with the titanium compound during the subsequent calcinations. Another operation in the process at which the antimony compound may be added is before or during the period of solution of the ore in acid. The antimony compound will remain in solution with the titanium and will later be co-precipitated so that an intimate mixture of antimony with hydrated titanium dioxide will be subsequently subjected to calcination. However, although the addition of the antimony compound to the pigment prior to calcination produces a product possessing superior properties over a pigment not so treated, it is to be understood that substantially better results are obtained when the antimony reagent is added to a pigment that has already been calcined, and this procedure is therefore preferred.

Although antimony trioxide is my preferred reagent it is to be understood that other oxides of antimony such as antimony pentoxide may be used herein. Further, salts of antimony such as antimony chloride or salts in which the antimony is present as an acid-forming element, such as sodium antimonate, potassium antimonate, and the like, may be used herein. Further, compounds which yield antimony oxide during the oxidizing calcination which prevails in internally fired pigment calciner may be employed. Included in this group are antimony sulfide and organic compounds of antimony such as potassium antimony tartrate or tartar emetic. Further, antimonous or antimonic salts may be used herein.

It is still further to be understood that the relative proportion of the antimony compound and the titanium oxide can be selected over a wide range depending upon the particular properties desired in the pigment. However, a composition analyzing more than about 55% antimony oxide is not considered advisable due to the decrease of hiding power which is encountered as the antimony content is increased. Amounts as low as about 0.1% produce marked improvements in stability, softness, and tone.

Further benefits are obtained by increasing the amount of antimony reagent up to 10% or 20% but beyond this point further improvements in durability properties are not substantial, although the high quality of the pigment is obtained except for the decrease of hiding power which accompanies the dilution of the high hiding power constituent of the pigment, namely, titanium dioxide.

Although the invention has been described with particular reference to titanium dioxide pigments it is to be understood that it is not limited thereto. Thus, the use of composite titanium pigments containing extenders such as barium sulfate, calcium sulfate, and the like, as well as pigments containing titanates is within the scope of this invention.

It is still further to be understood that when the antimony compound is used in combination with a conditioning agent such as a potassium sulfate, sodium sulfate, or the alkali metal carbonates, preferably potassium carbonate, and the like, the amount of said conditioning used is usually between about 0.05% and about 2% based on the $TiO_2$. However, it is not necessary that the antimony compound be used in combination with a conditioning agent since improved results are obtained when the antimony compound alone is added.

Although the antimony and titanium compounds are subjected to temperatures at which antimony oxide exerts an appreciable pressure, substantially none of the antimony is lost through volatilization. It is presumed, therefore, that a new compound is formed by treating the antimony and titanium compounds which are not decomposed by further heating, within the operating limits of the present invention.

I have found that the benefits of this invention are obtained by calcination of rutile raw pigments such as are produced in the processes of U. S. Patent 2,062,133. Titanium oxide in this crystal form is likewise improved in its durability characteristics by addition of an antimony compound as described herein. The same modifications for the treatment apply in the case of rutile precipitates as are given above for anatase precipitates which are obtained by the hydrolysis of sulfate solutions. In one operation the conditions may be altered to a small extent, this operation being calcination which is effective at a lower temperature in the case of rutile raw pigments. In the presence of antimony, satisfactory properties are obtainable at lower temperatures but the temperature described herein for the anatase precipitate is is also applicable to the rutile form.

According to my invention the titanium pigment produced is of excellent durability and chalk resistance and shows none of the degradation in color and opacity that would be expected if untreated titanium pigments were brought to the same degree of durability by extreme heat treatment. Furthermore, these pigments that have been treated according to the herein described invention are soft and do not resemble the hard and off-colored pigments of low opacity that are normally produced by calcination at excessive temperatures. The titanium pigments produced by the described process possess also the desirable attribute of being much more resistant to fading than normal untreated titanium pigments when incorporated with colored compounds in films and exposed to the weather or to sunlight. Further, the product has durability in automotive finishes such as are now used in the automotive industry equal to that of $TiO_2$ in $Sb_2O_3$ mixture comprising about 50 parts of $TiO_2$ and 50 parts of $Sb_2O_3$ but having only about 48% the hiding power of the product of this invention. This has been demonstrated by repeated tests in drying oil modified alkyd resins which are obtained by the interaction of polybasic acids and polyhydroxy alcohols and tested for resistance to the weather at various points including the extremely severe conditions encountered in Florida. The durability of my product containing from about 1% to about 2% of antimony trioxide has been found equal to prior art mixtures containing 40 to 50 parts by weight of antimony oxide, the remainder being commercial titanium oxide as previously available on the market. Further, my product containing this durability has slightly more than twice the hiding power of the prior art mixture.

As many apparently widely different embodiments of this invention may be made without departing from the spirit and scope thereof, it is to be understood that I do not limit myself to the specific embodiment except as defined in the appended claims.

Having described the present invention the following is claimed as new and useful:

1. Process for the preparation of titanium dioxide pigments possessing improved pigment properties which comprises calcining in the absence of amounts of alkali metal compounds exceeding about 2% hydrated titanium-oxygen compounds intimately associated with an antimony-oxygen compound, the latter being present in amounts equal to between 0.1 percent and 55 percent Sb based on the $TiO_2$ content of the hydrated titanium-oxygen compounds at temperatures between about 900° C. and 1100° C. for sufficient length of time to develop the pigment properties of the titanium dioxide.

2. Process for the preparation of titanium dioxide pigments possessing improved pigment properties which comprises calcining hydrated titanium-oxygen compounds intimately associated with antimony trioxide and potassium carbonate, the antimony trioxide being present in amount between 0.1 percent and 10.0 percent and the potassium carbonate being present in amounts between 0.05 percent and 2.0 percent, both amounts being based on the $TiO_2$ content of the hydrated titanium-oxygen compounds at temperatures between about 900° C. and 1100° C. for sufficient length of time to develop the pigment properties of the titanium dioxide.

3. Process for the preparation of titanium dioxide pigments possessing improved pigment properties which comprises calcining in the absence of amounts of alkali metal compounds exceeding about 2% hydrated titanium-oxygen compounds intimately associated with antimony trioxide in amounts equal to between 0.1 percent and 20.0 percent Sb based on the $TiO_2$ content of the hydrated titanium-oxygen compounds at temperatures between about 900° C. and 1100° C. for a sufficient length of time to develop the pigment properties of the titanium dioxide.

4. A titanium dioxide pigment possessing a neutral tone, a soft texture, fastness to light, durability in paint films, and little tendency to promote the fading of organic dyestuffs comprising particles of titanium dioxide having combined therewith an amount of antimony analyzing between 0.1 percent and 55 per cent Sb based on the weight of the $TiO_2$, said pigments containing less than about 2% of combined alkali metal calculated as alkali metal carbonate.

5. Process for the preparation of titanium dioxide pigments possessing improved pigment properties which comprises calcining hydrated titanium-oxygen compounds intimately associated with not more than about 2% of a water-soluble alkaline alkali metal compound and an amount of an antimony compound selected from the group consisting of antimony-oxygen compounds and compounds of antimony which on calcination yield antimony-oxygen compounds equivalent to between about 0.1 percent and about 55 percent Sb based on the titanium calculated as $TiO_2$ contained in the hydrated titanium-oxygen compounds at temperatures between about 900° C. and about 1100° C. for sufficient length of time to develop the pigment properties of the titanium dioxide.

6. Process for the preparation of titanium pigments possessing improved pigment properties which comprises calcining at a temperature between about 800° C. and about 1100° C. a mixture consisting of precipitated hydrous titanium oxide, between about 0.1% and about 20%, calculated as Sb and based on the titanium dioxide content, of an antimony compound selected from the group consisting of antimony-oxygen compounds and compounds of antimony which on calcination yield antimony-oxygen compounds, and less than about 2% of alkali metal compounds, said calcination being carried on for a sufficient length of time to develop the pigment properties.

7. Process for the preparation of titanium pigments possessing improved pigment properties which comprises preparing a titanium dioxide hydrolysate by the hydrolysis of a titanium salt solution, filtering and washing the precipitate to substantially free it of acid and color imparting impurities, adding to the resulting product between about 0.1% and about 20%, calculated as Sb and based on the titanium dioxide content, of an antimony compound selected from the group consisting of antimony-oxygen compounds and compounds of antimony which on calcination yield antimony-oxygen compounds, and subsequently calcining at a temperature between about 800° C. and about 1100° C. in the absence of amounts of alkali metal compounds exceeding about 2%, said calcination being carried on for a sufficient length of time to develop the pigment properties of the titanium dioxide.

8. Process for the preparation of titanium pigments possessing improved pigment properties which comprises calcining a mixture consisting of precipitated hydrous titanium oxide, between about 0.5% and about 5%, calculated as Sb and based on the titanium dioxide content, of antimony trioxide, and less than about 2% of alkali metal compounds, said calcination being carried on for a sufficient length of time to develop the pigment properties.

9. Process for the preparation of titanium pigments possessing improved pigment properties which comprises calcining a mixture consisting of precipitated hydrous titanium oxide and less than about 2% of alkali metal compounds, adding to the resulting calcined product between about 0.1% and about 55%, calculated as Sb and based on the weight of the titanium dioxide, of an antimony compound selected from the group consisting of antimony-oxygen compounds and compounds of antimony which on calcination yield antimony-oxygen compounds, and thereafter calcining the resulting mixture for a sufficient length of time to develop the pigment properties.

10. Process for the preparation of titanium pigments possessing improved pigment properties which comprises calcining at a temperature between about 800° C. and about 1100° C. a mixture consisting of precipitated hydrous titanium oxide and less than about 2% of alkali metal compounds, adding to the resulting calcined product between about 0.1% and about 20%, calculated as Sb and based on the weight of the titanium dioxide, of an antimony compound selected from the group consisting of antimony-oxygen compounds and compounds of antimony which on calcination yield antimony-oxygen compounds, and thereafter calcining the resulting mixture at a temperature between about 500° C. and about 750° C. for a sufficient length of time to develop the pigment properties.

11. Process for the preparation of titanium pigments possessing improved pigment properties which comprises preparing a titanium dioxide hydrolysate by the hydrolysis of a titanium salt solution, filtering and washing the titanium precipitate to substantially free it from acid and color imparting impurities, calcining the product so obtained at a temperature between about 800° C. and about 1100° C. in the absence of alkali metal compounds exceeding about 2%, wet grinding and wet blending the resulting titanium dioxide pigment with between about 0.1% and about 20%, calculated as Sb and based on the titanium dioxide, of an antimony compound selected from the group consisting of antimony-oxygen compounds and compounds of antimony which on calcination yield antimony-oxygen compounds, and thereafter calcining the resulting mixture at a temperature between about 500° C. and about 750° C. for a sufficient length of time to develop the pigment properties.

12. Process for the preparation of titanium pigments possessing improved pigment properties which comprises calcining at a temperature between about 800° C. and about 1100° C. a mixture consisting of precipitated hydrous titanium oxide and less than about 2% of alkali metal compounds, adding to the resulting calcined product between about 0.5% and about 5% calculated as Sb and based on the titanium dioxide, of antimony trioxide, and thereafter calcining the resulting mixture at a temperature between about 500° C. and about 750° C.

13. A titanium dioxide pigment possessing a neutral tone, a soft texture, fastness to light, durability in paint films, and little tendency to promote the fading of organic dyestuffs which consists of a co-calcined mixture of precipitated titanium dioxide, between about 0.1% and about 20%, calculated as Sb and based on the weight of the titanium dioxide, of an antimony compound selected from the group consisting of antimony-oxygen compounds and compounds of antimony which on calcination yield antimony-oxygen compounds, and less than about 2% of alkali metal compounds.

14. A titanium dioxide pigment possessing a neutral tone, a soft texture, fastness to light, durability in paint films, and little tendency to promote the fading of organic dyestuffs which consists of a co-calcined mixture of precipitated hydrous titanium oxide, between about 0.5% and about 5%, calculated as Sb and based on the weight of the titanium dioxide, of an antimony compound selected from the group consisting of antimony-oxygen compounds and compounds of antimony which on calcination yield antimony-oxygen compounds, and less than about 2% of alkali metal compounds.

15. A titanium dioxide pigment possessing a neutral tone, a soft texture, fastness to light, durability in paint films, and little tendency to promote the fading of organic dyestuffs which consists of a co-calcined mixture of precipitated hydrous titanium oxide, between about 0.5% and about 5%, calculated as Sb and based on the weight of the titanium dioxide, of antimony trioxide, and less than about 2% of combined alkali metal compounds.

16. Process for the preparation of titanium pigments possessing improved resistance to chalking when employed in film forming vehicles which comprises calcining a mixture consisting of precipitated titanium dioxide, between about 0.1% and about 55%, calculated as Sb and based on the titanium dioxide content, of an antimony compound selected from the group consisting of antimony-oxygen compounds and compounds of antimony which on calcination yield antimony-oxygen compounds, said calcination being carried on for a sufficient length of time to develop the pigment properties of the titanium dioxide.

17. A titanium dioxide pigment possessing a neutral tone, a soft texture, fastness to light, durability in paint films, and little tendency to promote the fading of organic dyestuffs which consists of a co-calcined mixture of precipitated titanium dioxide, between about 0.1% and about 55%, calculated as Sb and based on the weight of the titanium dioxide, of an antimony compound selected from the group consisting of antimony-oxygen compounds and compounds of antimony which on calcination yield antimony-oxygen compounds.

JAMES E. BOOGE.